Feb. 16, 1971 M. W. MULLER ET AL 3,564,449
OPTICAL MASER
Original Filed Aug. 22, 1962
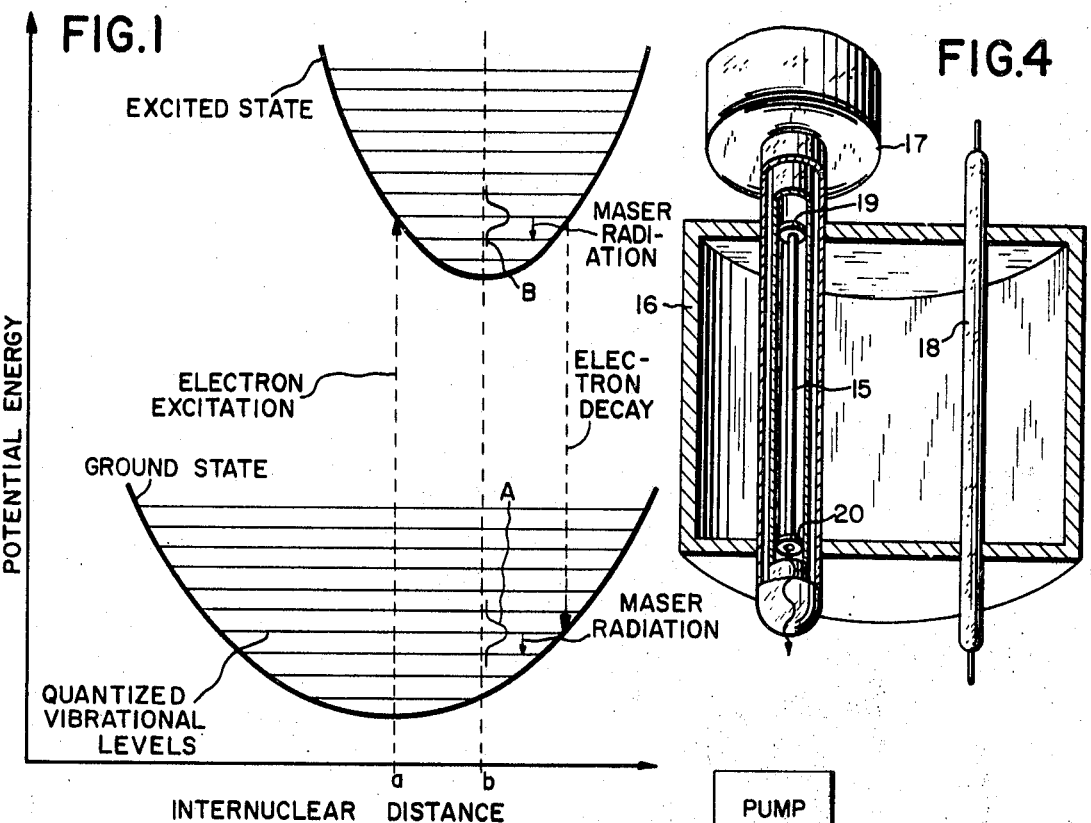
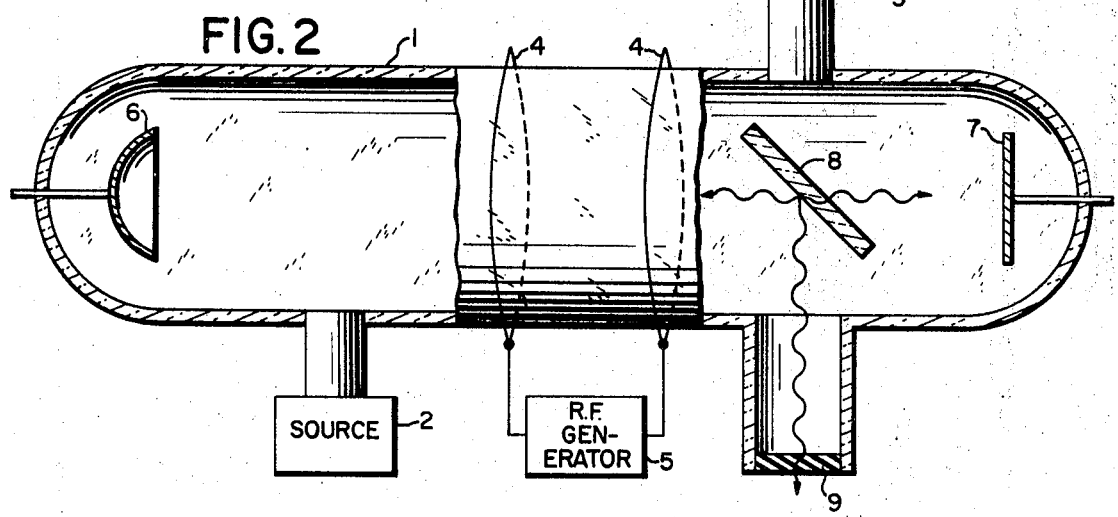
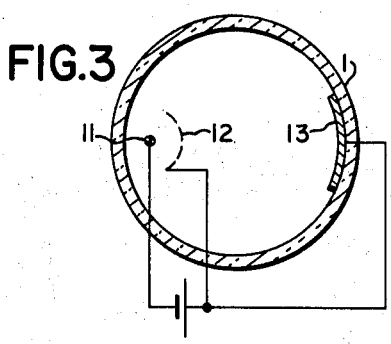
INVENTORS
MARCEL W. MULLER
ARDEN SHER
BY *J. E. Rosenblum*
ATTORNEY United States Patent Office 3,564,449
Patented Feb. 16, 1971

3,564,449
OPTICAL MASER
Marcel W. Muller, Palo Alto, and Arden Sher, Sunnyvale, Calif., assignors to Varian Associates, Palo Alto, Calif.
Continuation of application Ser. No. 218,578, Aug. 22, 1962. This application Aug. 21, 1967, Ser. No. 662,186
Int. Cl. H01s 3/16, 3/22, 3/14
U.S. Cl. 331—94.5
18 Claims

ABSTRACT OF THE DISCLOSURE

A method and apparatus is disclosed for effecting electronic transitions of the orbital electrons of the molecules of an active laser medium between two electronic states of the bound molecules in which the equilibrium geometrical configuration of atomic nuclei is different thereby creating population inversions between nuclear vibrational levels of said molecules sufficient to establish stimulated emission of radiation due to transitions between the nuclear vibrational levels.

---

This is a continuation of Ser. No. 218,578 filed Aug. 22, 1962, now abandoned.

The present invention relates in general to devices, known as "masers," for generating coherent radiation by stimulated emission of radiation from a quantum resonant medium, and more particularly to masers which operate at optical (including infrared) frequencies.

Previously available optical masers have utilized electronic transitions between the energy levels of a single atom. For a review of prior work in this field, reference is made to the article "Optical Masers" by A. L. Schawlow in Scientific American, 204, 52 (June 1961). Such transitions become relatively scarce at infrared wavelengths greater than a few microns, thereby imposing a serious limitation on the availability of masers at such wavelengths which would be particularly useful in optical communication systems and the like. It is known that vibrational transitions of molecules give rise to strong spectral lines over a wide range of frequencies including the far infrared region. Heretofore, however, no convenient scheme has been proposed whereby these transitions may be used in a maser.

Accordingly, one object of the present invention is the provision of an excitation or pumping scheme enabling maser action between molecular vibrational levels. Generally speaking, this is accomplished by effecting electronic transitions which place the molecule in a non-equilibrium state according to the Franck-Condon principle.

Another limitation on the availability of far infrared masers results from the fact that when a solid-state device is attempted by embedding the active material in a crystal lattice, relaxation due to vibrational or phonon interaction with the lattice at the infrared frequencies may shorten the effective lifetime of the active species to such an extent that maser action is not feasible.

A second object of the present invention is the provision of a solid-state maser in which undesired interactions, such as those mentioned in the preceding paragraph, are prevented by embedding the active material in a noble gas solid.

The various features and advantages of the present invention will become more apparent upon consideration of the following specification, taken in connection with the accompanying drawings, wherein:

FIG. 1 is an energy level diagram used to explain the operating principles of the present invention, FIG. 2 is a perspective view of a gas maser in accordance with the present invention, FIG. 3 is a cross-sectional view of a modification to the embodiment of FIG. 2, and FIG. 4 is a fragmentary perspective view of a solid-state maser in accordance with the present invention.

The molecular excitation scheme according to the present invention is illustrated in FIG. 1. The lower curve in FIG. 1 illustrates the potential energy of a molecule with unexcited ground state electrons, this energy being plotted as a function of the position of one of the atomic nuclei in the molecule. The equilibrium position of the nucleus is $a$, and it can vibrate about this equilibrium position in certain discrete amplitudes giving rise to a vibrational energy level structure for the molecule as indicated.

If now an orbital electron is raised to an excited state, as by optical irradiation or particle impact supplying energy quanta typically in the visible and near ultraviolet region, the Franck-Condon principle (resulting from the work of J. Franck and E. U. Condon—see American Journal of Physics 5, 365 [1947]) states that this electronic transition will take place without appreciable movement of the atomic nuclei. However, the binding forces which hold the nuclei together are furnished by the electrons, and they will in general be different for different electronic states such that the potential energy function (upper curve) establishes a new nuclear equilibrium position $b$.

We have determined that the non-equilibrium condition resulting from such electronic excitation can result in a situation whereby those excited vibrational motions whose amplitudes extend near the old equilibrium position $a$ are preferentially populated, as indicated by level distribution curve B. A population inversion then exists in which certain high energy vibrational levels are substantially more populated than certain lower energy vibrational levels, and the system can undergo transitions from the higher to lower sublevels by the emission of maser radiation.

In general, the molecules which are used as the active material are those in which the geometrical configuration of the constituent nuclei is different in an electronically excited state than in the ground state. The simplest examples are diatomic molecules, such as HD, NO, AuCl, in which the equilibrium separation between the nuclei is different for two states. We have further determined that certain polyatomic molecules are also suitable. For example: triatomic molecules such as $NO_2$ or $H_2O$, whose bond angle is different in two different electronic states, such that a transition between these electronic states excites a bending ($\nu_2$) vibration. An advantage of this kind of excitation is that the typical frequencies of the vibration are relatively low, and that the corresponding dipole moments are rather large. Another example of suitable polyatomic molecules is a symmetric rotor such as $CH_3Cl$ whose equilibrium axial length changes in an electronic transition. Such molecules permit the utilization of the vibrations of certain bonds (in the example cited, of the C—Cl bond) which in the diatomic form may occur only in reactive free radicals.

We have also determined that a population inversion (indicated by distribution curve A) can result between vibrational levels of the ground electronic states as a result of electronic excitation and subsequent (optical) decay. This occurs, as indicated in FIG. 1, because the decay occurs preferentially at times when the nuclei are at the turning points of their vibration (this is equivalent, in classical terminology, to the statement that the largest wave function amplitudes occur at these points). Although the population inversion obtained in this way is typically smaller than that in the excited state, this is compensated by the absence of lifetime reduction due to spontaneous emission. With this particular scheme of obtaining an inversion of the populations of vibrational levels, the intermediate electronically excited state need only be long-lived compared with a period of nuclear oscillation (typically of the order of $10^{-12}$ to $10^{-13}$ seconds), a condition which is generally satisfied even if the transition to the excited state is strongly allowed. The intermediate state may be a state of the neutral molecule, or it may also be a state resulting from temporary electron attachment (virtual negative ion formation).

The electronic excitation transitions may be made either to a bound atomic state, or to an unbound state resulting in ionization. The latter type of transition has the advantages that the lifetime of vibrational excitations is limited only by the shorter of either electron-ion recombination or spontaneous radiation between vibrational levels (both of these times being longer than the time for spontaneous emission radiation between the excited and ground electronic states such as can occur in bound electronic states), and also a broader band of excitation frequencies will be effective so that, for example, broadband optical irradiation may be used efficiently for the excitation. The ionizing transition can produce a population inversion among the vibrational levels of the ground electronic state of the molecular ion (which may be regarded as an excited electronic state of the molecule) either by a direct transition or by a cascade process via an excited electronic state of the ion. Examples of suitable molecules for ionization are BeH and $O^{16}O^{18}$.

One problem which may exist in the event that optical pumping is used for ionizing excitation is that the effective pumping wavelengths are typically in the so-called vacuum ultraviolet region and do not readily pass through the usual window materials. This may be overcome by cascade pumping via an excited bound molecular state at a more convenient pumping frequency. A suitable molecule for this purpose would have an excited bound state approximately halfway up to the ionized state with equilibrium internuclear distances and vibrational frequency substantally the same as the ground state.

It is to be noted here that the foregoing schemes involved only electronic excitation of a single chemical species, and thus distinguish fundamentally from the proposal made by J. S. Polanyi in The Journal of Chemical Physics 34, 347 (January 1961) in which population inversions are created through exothermic chemical reactions.

FIG. 2 shows an illustrative structure for utilizing a gaseous molecular medium in accordance with the present invention, including a vacuum tube 1 to which is connected a suitable gas source 2 and a pump 3 for maintaining a desired pressure of active molecules. Electronic transitions are effected through the impact collisions of electrons in a discharge maintained by the high frequency field of coils 4 which are energized by a R.F. source 5. In order to provide sufficient cascading of photons (wave amplification by synchronously-phased reradiation) for self-sustaining maser action, an optical resonator is formed by mirrors 6 and 7 designed for efficient axial reflection at the maser radiation frequency. The maser radiation thus undergoes numerous reflections between the mirrors until deflected by inclined output coupling plate 8 which is set nearly at Brewster's angle to the tube axis for maximum transmission and hence minimum reflection and resonator loading. Upon reflection from the output coupling plate 8, the maser radiation passes through vacuum-sealing windows 9 for external utilization.

In the case where deuterium hydride is used as the gas, maser radiation can be expected from the HD+ ion at a wavelength of 5.4 microns. In order to optimize the optical properties of the system for this wavelength, the mirrors 6 and 7 may have a gold reflecting surface; the output coupling plate 8 may be made of barium fluoride; and the window 9 may be made of sapphire. Also the inside of the tube 1 may be lightly silver-coated in order to facilitate recombination of dissociated molecules for reexcitation.

Particularly in the case where excitation to a bound state is involved, it may be desirable to concentrate the energy of the impact electrons in a narrow range corresponding to the linewidth of the desired electron transition. This may be accomplished by substituting the monoenergetic electron arrangement of FIG. 3 for the discharge electron means 4 and 5 in FIG. 2. Here electrons emitted from a long tungsten filament 11, supported axially of the tube 1, are accelerated to the desired energy by a D.C. voltage applied to electron-permeable acceleration electrode 12, and are collected by electrode 13 which may be integral with the tube 1.

Many modifications of the particular structures shown in FIGS. 2 and 3 will be apparent to those skilled in the art for effecting electronic transitions in a gaseous molecular medium and obtaining maser radiation therefrom.

FIG. 4 shows an illustrative structure for utilizing a solid-state, and hence inherently higher-power, medium in accordance with the present invention. The active material, in the form of a rod 15, is supported along the focus of an interiorly-polished elliptical cylindrical cavity 16 together with a liquid nitrogen temperature-control Dewar structure 17. An optical excitation lamp 18 is supported along the other focus whereby substantially all of the radiation emitted thereby is reflected from the elliptical cylindrical surface of cavity 16 and focused on the active rod 15 to produce the desired electronic transitions. Reflecting member 19 is designed to make one end of the rod 15 substantially totally reflecting to the maser radiation, and reflecting member 20 is designed to make the other end slightly transparent. Thus an optical resonator results from multiple reflections between the members 19 and 20, and the output radiation passes through the member 20.

According to one aspect of the present invention, the solid-state active medium is formed by the embedding the active material in a noble gas solid. This may be readily accomplished for a large variety of active materials by the technique of substitutional impurities as described, for example, by M. McCarty and G. W. Robinson, Molecular Physics 2, 415 (1959). Such solids have low Debye temperatures so that it is possible to operate in the far infrared frequency range without the excessively short non-radiative phonon relaxation times which exist in most other solids; they trap the active materials in face center cubic crystalline sites of high symmetry in which the coupling with the phonon spectrum is small; and they form reasonably good crystals which are transparent at all frequencies of interest. Xenon is particularly advantageous in that it is a large atom providing large vacancies in which to trap the active material and hence ordinarily has the smallest effect on the frequency and linewidth of any spectral line whose frequency lies above the cut-off frequency of approximately $10^{11}$ c.p.s. corresponding to its Debye temperature of 55° K.; it is not radioactive; and it can be operated at liquid nitrogen temperatures (77° K.) instead of liquid helium temperatures (4.2° K.), since its melting point is sufficiently above the boiling point of liquid nitrogen that there is no appreciable self-diffusion of xenon atoms and the difference between the melting points of xenon and the boiling point of nitrogen is sufficient to avoid melting of the xenon crystal.

The above desirable properties of a noble gas solid host material are generally applicable to active materials utilizing both atomic and molecular transitions. When particularly used with molecular transitions they have the additional advantages of permitting the use of high densities of active material without incurring collision broadening and relaxation, and of quenching the rotational structure of vibration levels characteristic of free molecules. The latter effect is especially convenient in the case of heavy molecules which have small rotational constants and thus normally populate a substantial number of rotational sublevels in the gaseous state.

Many modifications of the particular structure of FIG. 4 will be apparent to those skilled in the art for effecting electronic transitions in a solid-state medium and obtaining maser radiation therefrom.

As is well known, a maser can operate either as a self-oscillator or as an amplifier of an external signal. The term "generation," as used herein, is intended to include both of these modes of operation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A maser comprising: an active medium of bound molecules; means effecting electronic transitions of the orbital electrons of the molecules between two electronic states of said bound molecules in which the equilibrium geometrical configuration of atomic nuclei is different thereby creating population inversions between nuclear vibrational levels of said molecules sufficient to establish stimulated emission of radiation due to transitions between said nuclear vibrational levels; and means for effecting a build-up of said radiation within said medium.

2. A maser according to claim 1 wherein said vibrational levels are the nuclear vibrational levels of an electronically excited state of the molecule.

3. A maser according to claim 1 wherein said nuclear vibrational levels are the nuclear vibrational levels of a ground electronic state of the molecule.

4. A maser according to claim 3 wherein a population inversion is obtained by effecting a transition to an excited electronic state of the molecule and a subsequent decay to the ground electronic state of the molecule.

5. A maser according to claim 1 wherein said nuclear vibrational transition is an allowed optical transition.

6. A maser according to claim 1 wherein said excited electronic state of the molecule is a virtual negative ion state.

7. A maser according to claim 1 wherein said electronic transitions of the molecule terminate in a bound state of the molecule.

8. A maser according to claim 1 wherein said electronic transitions terminate in an unbound ionized state of the molecule.

9. A maser according to claim 8 wherein said electronic transition of the orbital electron is made via an excited bound state.

10. A maser according to claim 1 wherein said molecules are diatomic molecules.

11. A maser according to claim 1 wherein said molecules are polyatomic molecules.

12. A solid-state maser comprising: an active element comprising active material embedded in a noble gas solid; means exciting population inversions between energy levels in said material for effecting radiation resulting from transitions between said levels; and resonator means for effecting multiple reflections of said radiation within said active material.

13. A maser according to claim 12 wherein said noble gas is xenon.

14. A maser according to claim 12 wherein said radiation is in the infrared region.

15. A maser according to claim 12 wherein said active material consists of molecules having two electronic states in which the equilibrium configuration of atomic nuclei is different, and said excitation means includes means for exciting electronic transitions between said states.

16. In a method for the generation of coherent radiation in a medium of bound molecules which are bound in the sense that the atoms making up each molecule are bound together to form the molecule the steps of, effecting electronic transition of the orbital electrons of the bound molecules between two electronic states of said bound molecules in which the equilibrium geometrical configuration of atomic nuclei is different for creating a population inversion between nuclear vibrational levels of said bound molecules sufficient to establish stimulated emission of radiation due to transitions between said nuclear vibrational levels, effecting a build-up of said radiation within said medium of bound molecules for a sufficient time to obtain coherent emission of radiation at the transition wavelength between the inverted nuclear vibrational levels of said bound molecules.

17. In the method of claim 16 wherein the steps of effecting orbital electronic transitions for creating population inversion between vibrational levels comprises the step of effecting such orbital electronic transition to create a population inversion between nuclear vibrational levels of the electronic ground state of the bound molecules.

18. In the method of claim 17 wherein the step of obtaining the population inversion of the nuclear vibrational levels includes effecting a decay of the excited orbital electronic state to the ground electronic state of the bound molecule.

References Cited

UNITED STATES PATENTS 3,159,707  12/1964  Bennett, Jr. et al. ____ 331—94.5

OTHER REFERENCES

Polanyi, "Proposal for an Infrared Maser Dependent on Vibrational Excitation," J. Chem. Phys. 34, January 1961, pp. 347–8.

Markham et al., "Use of a Different Type of Fluorescent Material as an Optical Maser," Nature, 191 (4788), August 1961, pp. 586–588.

Bennett, Jr. et al., "Dissociative Excitation Transfer and Optical Oscillation in Ne-$O_2$ and Ar-$O_2$ RF Discharges," Phys. Rev. Lett., 8, (12), June 15, 1962, pp. 470–3.

Schawlow et al., "Infrared and Optical Masers," Phys. Rev., 112, 1958, pp. 1940–9.

RONALD L. WIBERT, Primary Examiner

R. J. WEBSTER, Assistant Examiner